Patented Nov. 13, 1945

2,388,765

UNITED STATES PATENT OFFICE 2,388,765

TERPENE ETHERS

Alfred L. Rummelsburg, Wilmington, Del., assignor to Hercules Powder Company, Wilmington, Del., a corporation of Delaware No Drawing. Application June 17, 1943, Serial No. 491,219

13 Claims. (Cl. 260—611)

This invention relates to terpene ethers of unsaturated alcohols and more particularly to the terpene ethers of an unsaturated aliphatic alcohol of not more than six carbon atoms and to the method for the production of these terpene ethers.

In accordance with the present invention, it has been discovered that terpene ethers may be made when a terpene compound and an unsaturated aliphatic alcohol of not more than six carbon atoms are caused to be reacted with each other under a proper chemical environment.

Generally, it has been discovered that a terpene may be caused to be reacted with an unsaturated aliphatic alcohol when the two components are heated together in the presence of an etherification catalyst until etherification is at least partially complete.

More particularly, a terpene compound as, for example, the bicyclic terpene, camphene, the monocyclic terpene, dipentene, or the acyclic terpene, myrcene, may be caused to undergo an etherification reaction with an unsaturated aliphatic alcohol as, for example, allyl alcohol, methallyl alcohol, or crotyl alcohol when the two components are heated together at a temperature between about 10° C. and about 200° C. in the presence of a suitable etherification catalyst as, for example, sulfuric acid, para-toluene sulfonic acid, and boron trifluoride for a reaction time of about four hours, the temperature conditions and reaction time depending upon the terpene and alcohol components being used, together with the nature of the catalyst.

The process involved for the production of terpene ethers in accordance with this invention is illustrated by the following example, the parts being by weight:

EXAMPLE 1

*Allyl—Isobornyl ether*

An ether pot was charged with 300 parts of camphene and 300 parts of allyl alcohol together with one part of 95% sulfuric acid and the mixture heated at a temperature of 100° C. for a period of four hours and then cooled to 30° C. The reaction mixture was then passed through a water scrubber to remove all water-soluble components and then passed through a caustic scrubber to neutralize the mixture and then repassed through the water scrubber. The scrubbed reaction mixture was then fractionated at 20 mm. pressure to recover the substantially chemically pure allyl-isobornyl ether which was a colorless liquid having a unique fragrant odor and having a refractive index at 20° C. of 1.643 and a specific gravity of 0.914 at 20° C./4° C. A yield of 85% terpene ether was obtained.

Other terpenes were reacted with other aliphatic alcohols in accordance with the procedure set forth in Example 1, using various conditions of reaction as shown in the following examples:

| Example | Terpene | Amount, parts | Alcohol | Amount, parts | Temperature | Time | Catalyst | Amount, parts | Yield |
|---|---|---|---|---|---|---|---|---|---|
|  |  |  |  |  | °C. | Hours |  |  | Percent |
| 2 | Alpha-pinene | 500 | Allyl | 500 | 30–40 | 4 | 95% sulfuric acid | 20 | 26 |
| 3 | Dipentene | 500 | ----do---- | 500 | [1] 160 | 8 | ----do---- | 2 | 10 |
| 4 | Myrcene | 500 | ----do---- | 500 | 50 | 6 | ----do---- | 20 | 40 |
| 5 | Camphene | 500 | Crotyl | 500 | 100 | 4 | BF$_3$ | 10 | 35 |
| 6 | Dipentene | 500 | ----do---- | 500 | [1] 160 | 8 | HCl | 5 | 6 |
| 7 | Myrcene | 500 | ----do---- | 500 | 50 | 6 | H$_3$PO$_4$ (85%) | 20 | 25 |
| 8 | Camphene | 500 | Methallyl | 500 | 100 | 4 | p-Toluene sulfonic acid | 10 | 75 |

[1] Reaction carried out under pressure.

EXAMPLE 9

A mixture of 500 parts of sodium fenchylate and 500 parts of allyl chloride were heated under pressure at 130° C. for 8 hours. The product was recovered by the method described in Example 1. The yield of fenchyl allyl ether was 89%.

In accordance with the present invention, the general classes of terpenes found operable are the bicyclic, monocyclic, and acyclic terpenes. Typical bicyclic terpenes found operable are camphene, alpha-pinene, beta-pinene, alpha-fenchene, beta-fenchene, gamma-fenchene, cyclofenchene, tricyclene, alpha-thujene, beta-thujene, sabinene, 3-carene, 4-carene, bornylene. Typical monocyclic terpenes found operable are the paramenthadienes, dipentene, terpinolene, alpha-terpinene, beta-terpinene, gamma-terpinene, alpha-phellandrene, and pyronenes. Typical paramenthenes found operable are carvomenthene, 8-methene, dihydro-terpinolene, dihydrodipentene. Typical acylic terpenes found operable are the acyclic terpenes, myrcene, ocimene, cryptotaenene, and allo-ocimene, as well as dihydroacyclic terpenes. Terpene alcohols are also found operable in accordance with the present invention. Typical operable bicyclic terpene alcohols are fenchyl, isofenchyl, and borneol. Typical operable monocyclic terpene alcohols are carveol, perillyl, piperitol, pulegol, dihydrocarveol, alpha-terpineol, beta-terpineol, gamma-terpineol, terpineol-4, menthol, and dihydroterpineols. Typical operable dihydric monocyclic terpene alcohols are 1,8-terpin and 1,4-terpin. Typical operable acyclic terpene alcohols are citronellol, buplenol, geraniol, linalool, ocimenol, myrcenol, and the hydrogenation products of the unsaturated alcohols.

In carrying out the process of this invention, an unsaturated aliphatic alcohol of not more than six carbon atoms is caused to be reacted with a terpene compound by heating the components in the presence of an etherification catalyst. Catalysts found suitable in accordance with this invention are inorganic acids as, for example, sulfuric acid, paratoluene sulfonic acid, phosphoric acids, hydrochloric acid, hydrofluoric acid, boric acid, boron trifluoride and its organic ether complexes, perchloric acid and fluoboric acid. The catalyst most economical to use will depend upon the conditions under which the reaction is being carried out. Generally, sulfuric acid is preferred because of its many advantages including low cost and ease of removal from the products of reaction. From 0.1% to 10% by weight of catalyst may be utilized.

Temperatures of from about 10° C. to about 200° C. may be used in carrying out the etherification reaction between the terpenes and the unsaturated aliphatic alcohols of this invention and when using an acid acting etherification catalyst. When a terpene of the monocyclic or acyclic class is being etherified, it is preferred to use temperatures between about 40° C. and about 180° C. The bicyclic terpene, camphene, is readily etherified under temperatures between about 70° C. and about 150° C. The pinenes are preferably reacted under temperatures between about 30° C. and about 50° C. A closed system, or autoclave is used when the reaction temperature is above the reflux temperature of the reaction mixture.

The time of reaction required to provide at least partial completion of the etherification reaction will vary with the specific reactants used and with the specific conditions of contacting and will generally be within the range from about one to about 80 hours. An excess of the unsaturated aliphatic alcohol may, if desired, be employed. An excess of from about 0.1 mol to about 5 mols more alcohol than the amount of terpene being used may be employed and it is preferred to use about 0.2 mol to about 1 mol more alcohol than the amount of terpene used. On the other hand, in some cases an excess of terpene may be employed.

When terpene alcohols are to be etherified with one of the unsaturated alcohols of the present invention, it is necessary to form the alkali metal alcoholate as, for example, sodium or potassium fenchylate, terpinylate, or myrcenylate which must then be reacted with the halide of the unsaturated alcohol as, for example, allyl chloride, or bromide. The reaction is desirably carried out in a closed system at about 40° C. to about 150° C., and for a period of from about 1 to about 12 hours. An excess of the halide is usually employed. No catalyst is necessary when an alcoholate is reacted with allyl, methallyl, and crotyl halides. The reaction mixture is then water-washed, and vacuum distilled to separate the ethers.

If desired, inert solvents may be present during the preparation of the terpene ethers, by any of the processes herein described. Solvents such as acetone or other ketones, ethyl ether, isopropyl ether, petroleum hydrocarbons, aromatic hydrocarbons, chlorinated hydrocarbons, etc., may be employed. Chlorinated hydrocrabons are, in general, only used as solvents in cases of the direct reaction of terpenes with the unsaturated alcohols.

The method in accordance with the present invention may be carried out as a batch operation, or as a continuous process. The continuous process may comprise an ether pot into which is continuously fed the terpene and alcohol to be treated together with the etherification catalyst, heated by means of a steam coil, and from which pot the terpene ether vapors together with other components are sent to suitable water and caustic or alkali scrubbers and then to a fractionating column where the terpene ether is separated from the other components and sent to a storage tank. Unreacted terpene and alcohol may be recovered in a suitable fractionating column. In some cases the reaction mixture may be directly treated with alkali to neutralize the catalyst, followed by distillation.

Broadly the present invention contemplates the use of unsaturated aliphatic alcohols containing not more than six carbon atoms. These alcohols include the olefinic type, operable members of which are, for example, allyl alcohol, 2-buten-1-ol (crotyl), propenyl alcohol, iso-propenyl alcohol, 3-buten-1-ol, 3-buten-2-ol, 1-penten-3-ol, 4-penten-1-ol, 4-penten-2-ol, 3-penten-2-ol, 2-methyl-4-penten-2-ol, etc. These alcohols also include the acetylenic type, an operable member of which is, for example, 2-propyn-1-ol (propargyl). The terpene ethers produced in accordance with this invention may be represented by means of the following structural formula:

$$T-O-R$$

where T is a terpene radical and R is a radical of an unsaturated aliphatic alcohol containing not more than six carbon atoms.

In accordance with the foregoing description, it is aparent that a new composition of matter has been discovered which is a terpene ether of an unsaturated aliphatic alcohol of not more than six carbon atoms, together with the process for its production comprising reacting a terpene compound and an unsaturated aliphatic alcohol together in the presence of an etherification catalyst and removing the terpene ether from the reaction product.

What I claim and desire to protect by Letters Patent is:

1. The method of producing a terpene ether which includes reacting a terpene compound with an unsaturated aliphatic alcohol of not more than six carbon atoms in the presence of an acid catalyst at a temperature within the range of about 10° C. and about 200° C. until etherification is at least partially complete.

2. The method of producing a terpene ether which includes reacting camphene with an unsaturated aliphatic alcohol of not more than six carbon atoms in the presence of sulfuric acid at a temperature within the range of about 70° C. and about 150° C. until etherification is at least partially complete.

3. The method of producing a terpene ether which includes reacting dipentene with an unsaturated aliphatic alcohol of not more than six carbon atoms in the presence of sulfuric acid at a temperature within the range of about 40° C. and about 180° C. until etherification is at least partially complete.

4. The method of producing a terpene ether which includes reacting myrcene with an unsaturated aliphatic alcohol of not more than six carbon atoms in the presence of sulfuric acid at a temperature within the range of about 40° C. and about 180° C. until etherification is at least partially complete.

5. An ether having the formula T—O—R, in which T is a terpene radical and R is a radical of an unsaturated aliphatic alcohol containing not more than six carbon atoms.

6. An ether having the formula T—O—R, in which T is a bicyclic terpene radical and R is a radical of an unsaturated aliphatic alcohol containing not more than six carbon atoms.

7. An ether having the formula T—O—R, in which T is a monocyclic terpene radical and R is a radical of an unsaturated aliphatic alcohol containing not more than six carbon atoms.

8. An ether having the formula T—O—R, in which T is the isobornyl radical and R is a radical of an unsaturated aliphatic alcohol containing not more than six carbon atoms.

9. An ether having the formula T—O—R, in which T is the terpinyl radical and R is a radical of an unsaturated aliphatic alcohol containing not more than six carbon atoms.

10. An ether having the formula T—O—R, in which T is the fenchyl radical and R is a radical of an unsaturated aliphatic alcohol containing not more than six carbon atoms.

11. Allyl isobornyl ether.
12. Methallyl terpinyl ether.
13. Allyl fenchyl ether.

ALFRED L. RUMMELSBURG.